No. 875,336. PATENTED DEC. 31, 1907.
S. F. EVANS.
AUTOMATIC NON-REVERSING STOP.
APPLICATION FILED SEPT. 21, 1906.
2 SHEETS—SHEET 1.
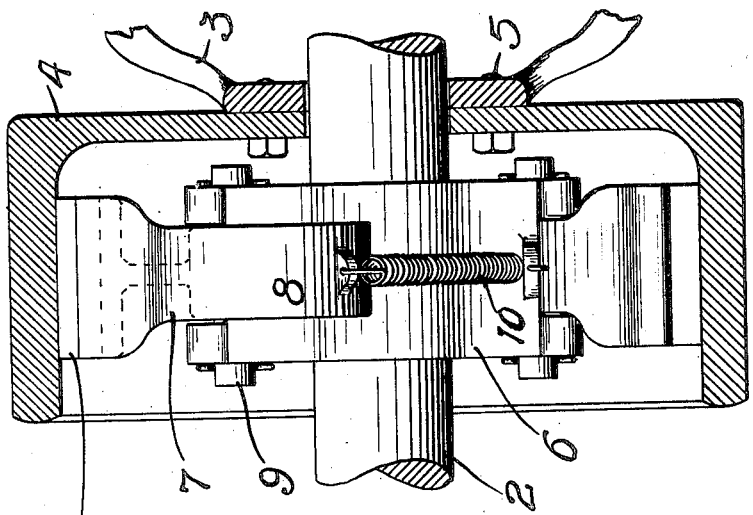
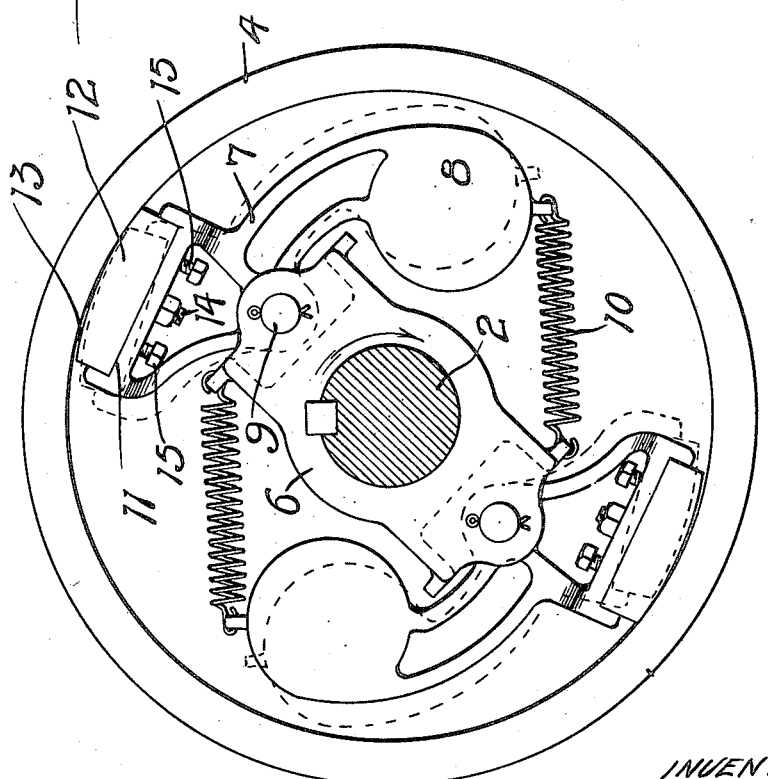
WITNESSES
INVENTOR
SCOTT F. EVANS
BY
HIS ATTORNEYS No. 875,336.
PATENTED DEC. 31, 1907.
S. F. EVANS.
AUTOMATIC NON-REVERSING STOP.
APPLICATION FILED SEPT. 21, 1906.
2 SHEETS—SHEET 2.
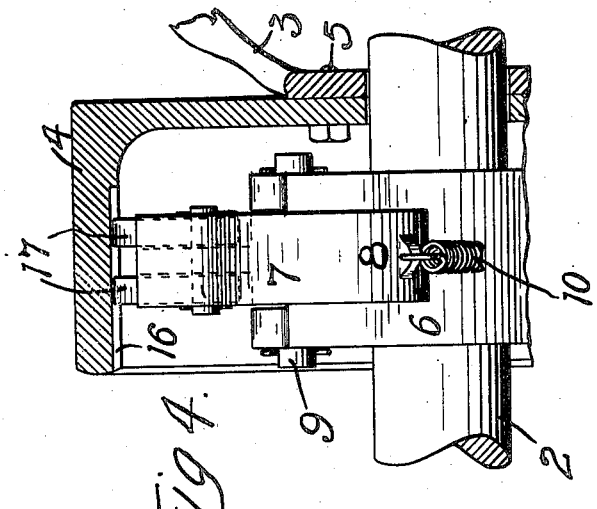
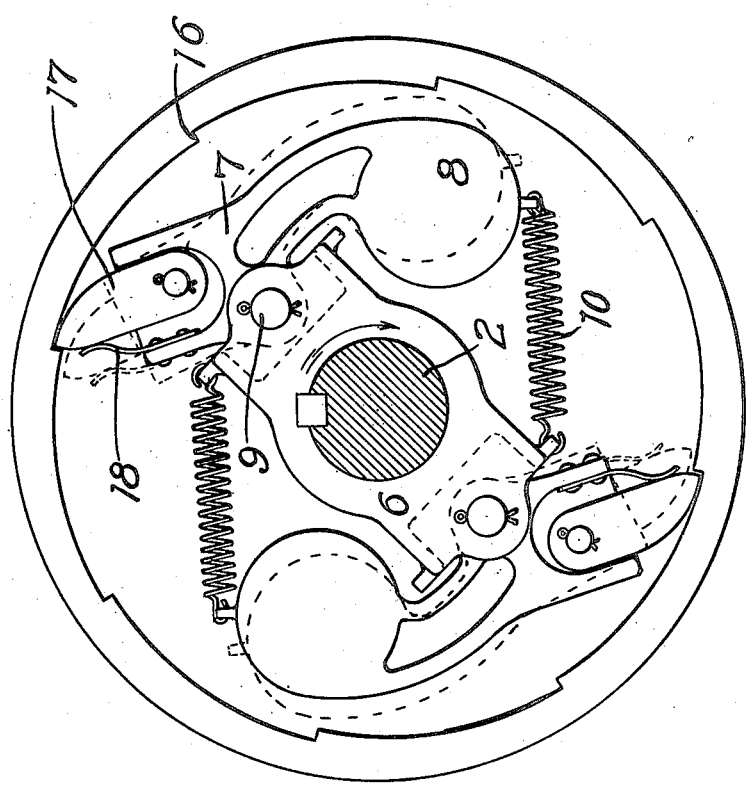
WITNESSES
INVENTOR
SCOTT F. EVANS
BY Paul & Paul
HIS ATTORNEYS

UNITED STATES PATENT OFFICE.

SCOTT F. EVANS, OF MINNEAPOLIS, MINNESOTA.

AUTOMATIC NON-REVERSING STOP.

No. 875,336.

Specification of Letters Patent.

Patented Dec. 31, 1907.

Application filed September 21, 1906. Serial No. 335,600.

*To all whom it may concern:*

Be it known that I, SCOTT F. EVANS, of Minneapolis, Hennepin county, Minnesota, have invented certain new and useful Improvements in Automatic Non-Reversing Stops, of which the following is a specification.

The object of my invention is to provide a non-reversing stop or brake device which, while permitting free movement of a shaft in one direction will automatically resist or oppose such movement in the opposite direction.

A further and particular object is to provide a friction stop applicable to the shaft of a motor or a counter shaft for driving an elevator leg for the purpose of preventing "backing up" and the consequent "choking" of the leg when the power is "off" unexpectedly.

A still further object is to provide a non-reversing automatic stop device of simple but strong and durable construction and one which will be positive and reliable in its action.

The invention consists generally in various constructions and combinations all as hereinafter described and particularly pointed out in the claims.

In the accompanying drawings, forming part of this specification, Figure 1 is an end view of a shaft showing my improved friction stop device applied thereto. Fig. 2 is a sectional view through the fixed ring which incloses the shaft and the braking shoe. Fig. 3 is an end view of a shaft showing a modification in the construction of the braking device. Fig. 4 is a sectional view illustrating the braking surface of the ring shown in Fig. 3.

In the drawing, 2 represents a shaft and 3 a portion of the frame of a motor whereon a ring 4 is secured by a suitable means as bolts 5 concentric with the shaft 2.

6 is a block keyed on the shaft and 7 are arms having weighted ends 8 and pivoted at 9 intermediate to their ends to the block 6 upon opposite sides of the said shaft. Springs 10 connect the weighted ends of the arm 7 with the block 6 and normally tend to draw said ends inward and throw the opposite ends of the arm out toward the inner surface of the ring 4. When the shaft is revolved at a predetermined speed the weighted ends of the arms will be thrown outward by centrifugal force and the opposite ends swung inwardly as usual in devices of this kind. The opposite end of each arm 7 from the weighted end 8 is provided with a seat 11 adapted to receive a shoe 12 which has a flat under surface to fit the bottom of the seat and a curved outer surface 13 to engage the braking surface of the ring. The shoes are thicker at one end than at the other and when the shoes are swung to an operative position by the movement of their supporting arms the thicker ends of the shoes will contact first with the braking surface of the ring, then as the weighted ends of the arms 7 swing inwardly through the tension of their springs, the shoes will gradually seat themselves until their surfaces 13 are in full contact with the braking surface of the ring. The shape of the shoes will cause them to have a wedging effect or strain arising from the pressure on the braking surface being sustained by the pivots of the arms, and the shoes will immediately cramp or bind and positively lock the shaft against backward movement but will slide freely over the braking surface of the ring when the shaft is revolved forward. Each shoe is preferably mounted on a bolt 14 centrally arranged in the seat and adjusting bolts 15 at each end of the seat permit the oscillation of the shoe and the adjustment of its curved surface with respect to the braking surface of the ring. By means of this adjustment, the proper angle of engagement of each shoe with its braking surface can be determined to insure positive clamping of the shaft and the absolute prevention of backward movement. Normally the springs 10 will swing the weighted ends of the arms inward and press the friction shoe against the braking surface of the ring and backward movement of the shaft and motor will be positively prevented. As soon, however, as the motor shaft is revolved in the opposite or forward direction at a sufficient speed to overcome the power of the springs 10, the shoes will be automatically withdrawn from contact with the braking surface and the shaft will be allowed to revolve freely.

In Fig. 3 I have shown a modification which consists in providing the braking surface of the ring with a series of shoulders or teeth 16 extending transversely thereof at intervals and engaged by dogs 17 carried on the ends of the arms 7 in place of the friction shoes and pressed by means of springs 18 into engagement with the braking surface of the ring. These dogs will slip over the teeth 16 when the shaft is revolved in one direction and when the working speed is reached will swing out of contact entirely with the ring surface as indicated by dotted lines in Fig. 3. Any backward movement of the shaft, however, will be positively prevented by the engagement of the dogs with the teeth 16.

I have shown this automatic non-reversing stop device as applied to the shaft of a motor and designed particularly for use in connection with an elevator leg, but I do not wish to be confined to this use alone, as the invention is applicable wherever it is desired to prevent backward or reverse movement of a shaft by means of an automatic device released by centrifugal force when the shaft is revolved in one direction, and becoming instantly operative through its angle of engagement with the braking surface to lock the shaft against backward movement.

I claim as my invention:—

1. The combination, with a ring having an interior braking surface, of a shaft, arms pivotally supported thereby and having spring retracted ends adapted to be thrown outward by centrifugal force, and means carried by the opposite ends of said arms and arranged to engage the braking surface of said ring the strain arising from the pressure of said means on said surface being sustained by the pivots of said arms to lock said shaft against backward movement and said means swinging freely with said arms away from said braking surface against the tension of said springs to release said shaft when it is revolved in the other direction, substantially as described.

2. The combination, with a ring having an interior braking surface, of a shaft, arms pivotally supported thereby, shoes carried by said arms and having curved surfaces adapted to contact with said braking surface, said shoes being of greater depth at one end than at the other, the thicker ends of said shoes adapted to contact first with the braking surface of said ring, and said shoes when seated on said braking surface, having a wedging or cramping effect to lock said shaft against backward movement but permitting it to be freely revolved in the opposite direction, and means for tilting said shoes on said arm whereby the angle of their bearing surfaces may be changed with respect to said braking surface.

3. The combination, with a motor frame, of a ring secured thereon and having an interior braking surface, a motor shaft, a block keyed on said shaft, arms pivoted at points intermediate to their ends on said block, springs connecting said block with one end of each arm, shoes mounted on the opposite ends of said arms and swung into engagement with said braking surface by said springs when said shaft is stationary the strain arising from the pressure of said shoes on said surface being sustained by the pivots of said arms, whereby a wedging effect will be obtained between said pivots and said surface to lock said shaft against backward movement.

4. The combination, with a ring having an interior braking surface, of a shaft, arms pivotally supported at points intermediate to their ends thereon, springs connected to one end of said arms, shoes mounted in seats provided at the opposite ends of said arms and tapered from one end toward the other and having curved surfaces to engage the braking surface of said ring and adjusting bolts mounted in said seats and engaging said shoes whereby their angle with respect to said braking surface may be changed, substantially as described.

5. The combination, with a ring having an interior braking surface, of a shaft, arms pivotally supported thereon, shoes carried by said arms and having curved surfaces adapted to contact with said braking surface, said shoes tapering from one end toward the other, springs normally tending to hold said shoes in contact with said braking surface, the angle of engagement of said shoes with said braking surface causing the thicker ends of said shoes to first contact with said surface, and said shoes becoming fully seated on said braking surface when said arms have been moved to a predetermined position through the tension of said springs, and said shoes allowing said shaft to revolve freely in one direction but locking it against backward movement.

In witness whereof, I have hereunto set my hand this 15th day of September, 1906.

SCOTT F. EVANS.

Witnesses:
RICHARD PAUL,
J. B. ERA.